United States Patent [19]

Brelje et al.

[11] Patent Number: 5,127,730

[45] Date of Patent: Jul. 7, 1992

[54] MULTI-COLOR LASER SCANNING CONFOCAL IMAGING SYSTEM

[75] Inventors: Todd C. Brelje; Robert L. Sorenson, both of Minneapolis, Minn.

[73] Assignee: Regents of the University of Minnesota, St. Paul, Minn.

[21] Appl. No.: 565,625

[22] Filed: Aug. 10, 1990

[51] Int. Cl.$^5$ .............................................. G01N 21/64
[52] U.S. Cl. .................................... 356/318; 356/417; 250/458.1; 250/461.2; 358/93
[58] Field of Search .................. 356/72, 73, 318, 417; 250/458.1, 459.1, 461.1, 461.2; 358/93, 199, 206

[56] References Cited

U.S. PATENT DOCUMENTS

| | | |
|---|---|---|
| 4,684,602 | 8/1987 | Kino . |
| 4,689,491 | 8/1987 | Lindow et al. . |
| 4,710,635 | 12/1987 | Chupp .............................. 250/461.2 |
| 4,733,063 | 3/1988 | Kimura et al. . |
| 4,745,285 | 5/1988 | Recktenwald et al. ............. 356/318 |
| 4,786,813 | 11/1988 | Svanberg et al. ................. 250/461.2 |
| 4,791,310 | 12/1988 | Honig et al. ...................... 250/458.1 |
| 4,802,748 | 2/1989 | McCarthy et al. . |
| 4,847,823 | 7/1989 | Lindow et al. . |
| 4,863,276 | 9/1989 | Houpt et al. . |
| 4,884,880 | 12/1989 | Lichtman et al. . |
| 4,884,881 | 12/1989 | Lichtman et al. . |
| 4,919,516 | 4/1990 | Petran et al. . |
| 4,965,441 | 10/1990 | Picard . |
| 4,972,258 | 11/1990 | Wolf et al. ............................ 358/93 |

FOREIGN PATENT DOCUMENTS

| | | |
|---|---|---|
| 0270251 | 6/1988 | European Pat. Off. . |
| 0363931 | 4/1990 | European Pat. Off. . |
| WO88/07695 | 10/1988 | PCT Int'l Appl. . |
| WO90/00754 | 1/1990 | PCT Int'l Appl. . |
| 2184321A | 6/1987 | United Kingdom . |

OTHER PUBLICATIONS

"Computerized Quantification of Immunofluorescence-labeled Axon Terminals and Analysis of Co-localization of Neurochemicals in Axon Terminals with a Confocal Scanning Laser Microscope", by Karin Mossberg et al., 1990, published in The Journal of Hystochemistry and Cytochemistry, vol. 38 No. 2, pp. 179-190.

"MRC-500 Laser Scanning Confocal Imaging System Operating Manual", Oct. 1988.

"Probing DNA Structure and Function with a Multi-Wavelength Fluorescence Confocal Laser Microscope", by Arndt-Jovin et al., published in the Journal of Microscopy, vol. 157, Pt 1, pp. 61-72, Jan. 1990.

Primary Examiner—F. L. Evans
Attorney, Agent, or Firm—Merchant, Gould, Smith, Edell, Welter & Schmidt

[57] ABSTRACT

A true multi-color laser scanning confocal imaging system for use with a microscope is described in which a single laser having a multi-line output is used to simultaneously or individually excite a plurality of dyes. The images may be simultaneously viewed by a plurality of photomultiplier tubes to reconstruct an image showing distinct features of a specimen strained with different dyes. The images may also be constructed using a single detector in a time-multiplex fashion and using a computer to construct the image.

16 Claims, 10 Drawing Sheets

FIG. 1

PRIOR ART

FIG. 9

MULTI-COLOR LASER SCANNING CONFOCAL IMAGING SYSTEM

FIELD OF THE INVENTION

The present invention relates to confocal microscopy and in particular to laser scanning confocal microscopy in which laser light is used to excite dyes in a specimen.

BACKGROUND OF THE INVENTION

Confocal microscopy is well known in the art. The concept of confocal microscopy is that the image viewed by the microscope is confined to a very precise focal plane by limiting the depth of field of the image. Only those portions of the specimen which are in focus are detected. Out of focus regions of the sample appear dark. By changing the position of the focal plane, this important principle defines one major method for achieving optical sectioning.

The earliest versions of confocal microscopes used direct vision design with incoherent illumination. The field of illumination in the specimen was limited by a pin hole positioned on the illumination axis. The image of this pin hole is then projected on the specimen by a condenser lens. The illuminated point on the specimen reflects light (or as described below, emits fluorescent light). The reflected light of the image is then focused through an objective lens onto a detector. Either the specimen or the light focused on the image is scanned in a raster pattern so that the detector collects pixel information from a region of the specimen. The pixel information is then passed through a computer which can generate an image of the overall specimen.

Figure 1:
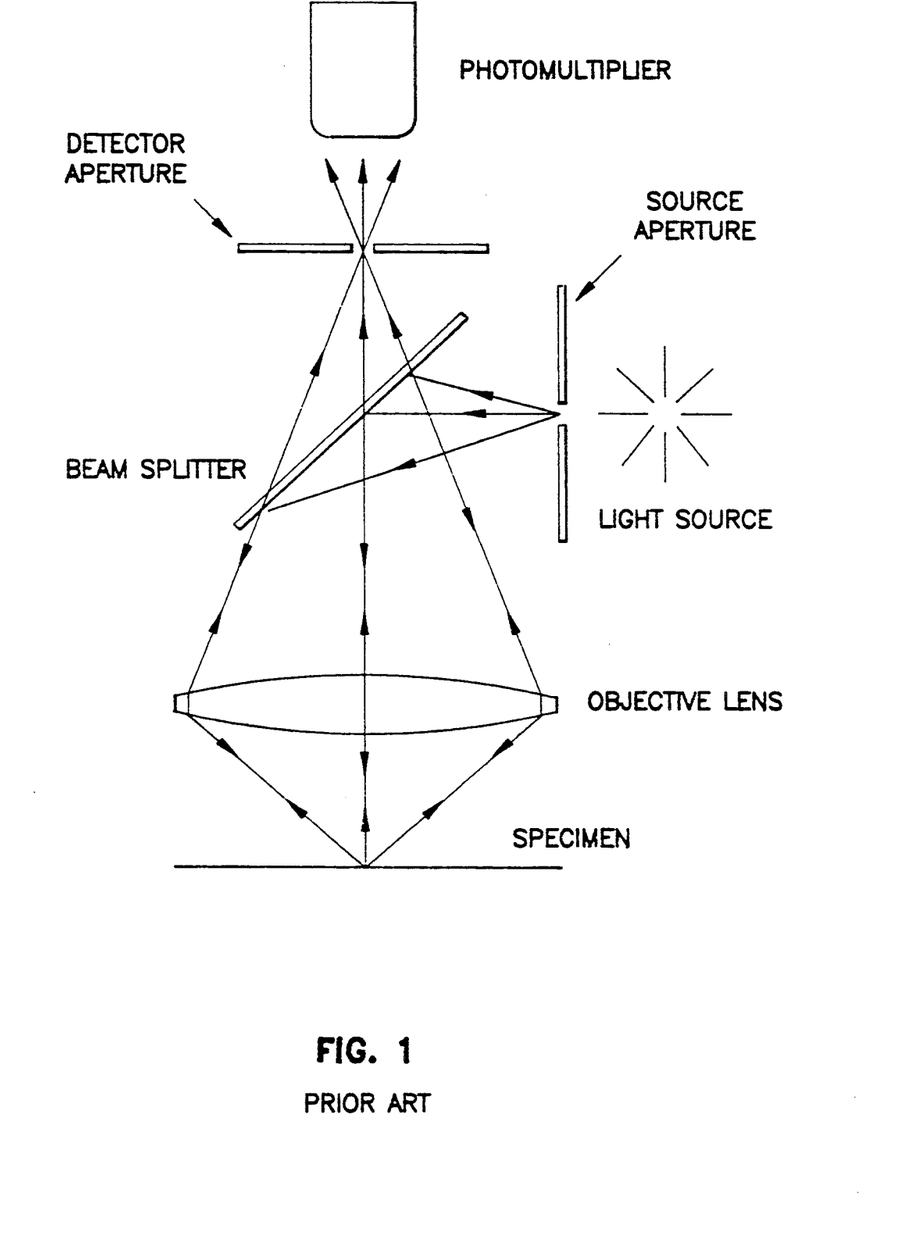
FIG. 1 is a diagram showing a prior art optical confocal microscope system.

The concept of the scanning confocal microscope is described in U.S. Pat. No. 3,013,467 to Marvin Minsky, which is hereby incorporated by reference. The optical path of the scanning confocal microscope may be constructed in transilluminating mode in which a separate condenser and objective lens is used in the same axis. In the alternative, the optical path of the scanning confocal microscope may be constructed in an epi-illuminating mode making a single objective lens serve both as the condenser and objective lens and using a dichroic or half mirror to collect the emitted light into a detector, as shown in FIG. 1.

In the Minsky patent, the raster scan is generated by moving the stage on which the specimen is supported by two orthogonally vibrating tuning forks that are driven by electromagnets. As the stage is moved in a raster scan pattern, the resulting image detected by the image detector is a serial raster scanned image.

The use of fluorescent dyes to stain the specimen being viewed further improved the range of applications to which scanning confocal microscopy could be applied. Especially in the area of immunofluorescence histochemistry and in other neuroanatomical techniques, the staining of specimens with dyes is particularly useful to aid in distinguishing different features within biological tissues. The stains may comprise dyes designed only to absorb light or dyes that emit light in response to absorption, which is called fluorescence. Fluorescent dyes have the advantage over dyes which only absorb light in that a given fluorescent marker will be visible only when illuminated with the appropriate filter set.

Fluorescence is a consequence of the interaction of a photon with a fluorophore. When a photon of light is absorbed by a molecule it may increase the potential energy of the molecule by raising an electron to a higher orbital state. An electron raised to a higher orbital state from its natural state will tend to revert to the natural state. When the electron falls from a higher to a lower orbital state, energy is released which is equal to the difference in energy between the two orbital states. When this occurs, part or all of its energy may be released as a photon having a wavelength (spectral line) proportional to the released energy. The resulting luminescence is called fluorescence (and in some circumstances phosphorescence). Excitation of a fluorophore molecule at one wavelength typically results in fluorescent emission at longer wavelengths of light.

Figure 2:
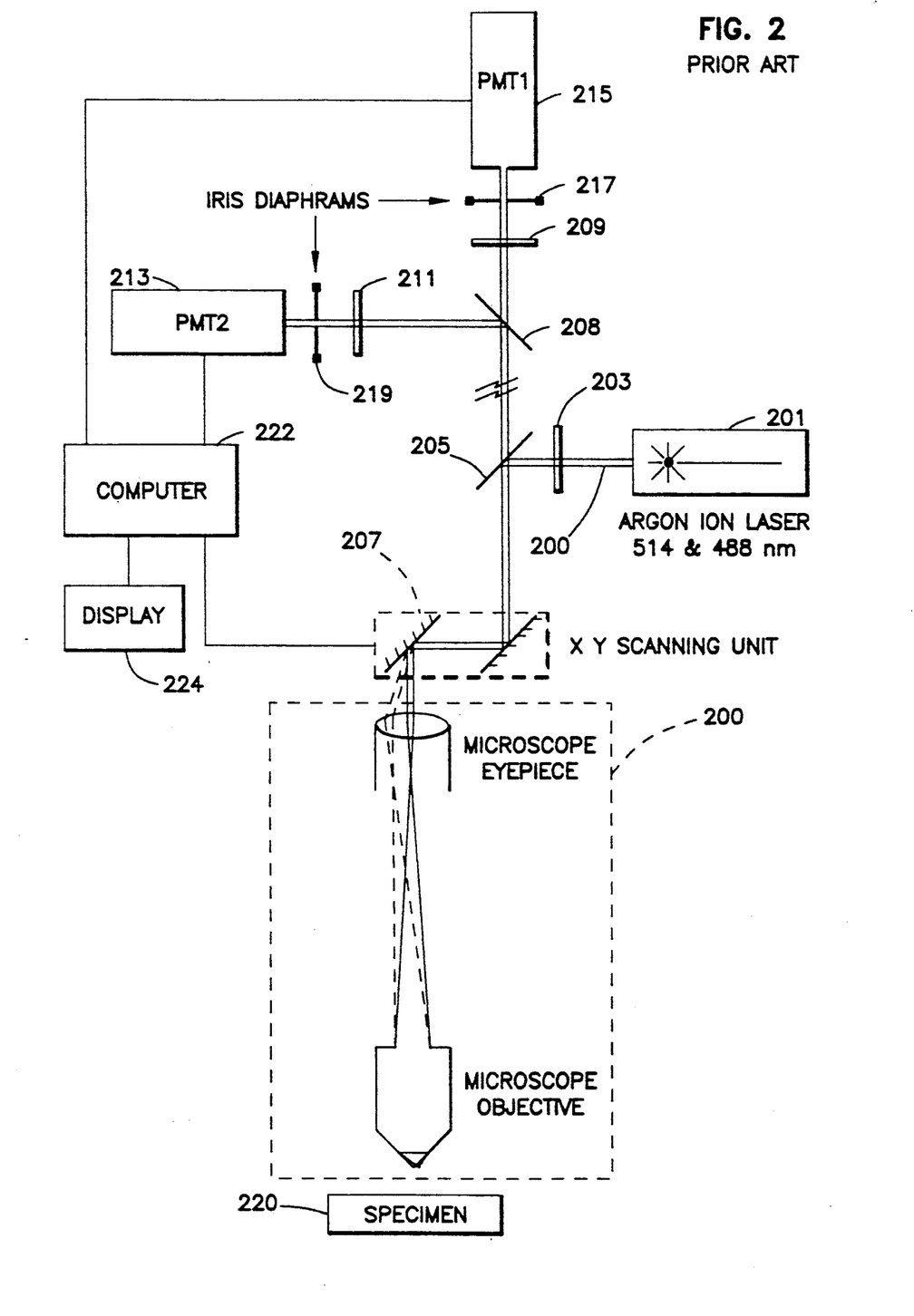
FIG. 2 is a diagram showing a prior art laser scanning confocal imaging system.

The scanning laser confocal microscope improved on the design of the scanning confocal microscope and the use of fluorophores by using coherent light to scan the stained specimen. The monochromaticity, high intensity and lack of divergence of the laser light contributed to improvements in the resulting images. In an epi-illuminating laser scanning confocal microscope of the prior art, as shown in FIG. 2, the laser light 200 is scanned onto the specimen 220 from above and is reflected to a detector 215 in the same focal path as the incident light through the use of a half mirror or dichroic mirror 205. Typically, the specimen is stained with fluorescent dyes to enhance specific features within the specimen which may be of interest.

The MRC-600 laser scanning confocal imaging system, shown diagrammatically in FIG. 2, is manufactured by BioRad Microscience of Hemel Hempstead, Herts, England. This laser scanning confocal microscope system is adaptable for use with a number of upright and inverted microscopes available from microscope vendors such as Nikon, Zeiss, Olympus and Leitz. The coherent illumination is an argon ion laser 201 having primary lines at 514 and 488 nanometers (nm). The emitted laser light 200 also has a plurality of minor spectral lines as determined by argon. The lines are filtered by the external filter 203 which selects either the 488 nm (blue) line or the 514 nm (green) line by means of an excitation filter 203. The selected light is reflected by a beam splitter 205 which includes a dichroic mirror used for fluorescent imaging. If simple reflection imaging is required, a semi-reflecting or half mirror may be used in place of the dichroic mirror 205.

The argon ion laser is available from Ion Laser Technology Company of Salt Lake City, Utah, part number 5425A. The argon ion laser is used to excite fluorescent dyes in the specimen which emit light slightly shifted in the spectrum in response to the excitation wavelength of the spectral lines of the laser light. The dyes are selected based upon their sensitivity to light, their affinity for features desired to be viewed in specimens and their fluorescent capabilities.

The light 200 from the laser is passed through the scanning unit 207 where it is raster scanned in an XY scanning movement by means of two oscillating mirrors. The laser beam is then passed through a microscope eyepiece onto the specimen such that a scanning spot caused by the scanning unit 207 scans the specimen. Reflected light or fluorescent light from the specimen passes back through the scanning system along the same path as the incident laser light. Reflection of the light is so rapid that the mirrors have not shifted position so that the light retraces the exact original path in the reverse direction. A portion of the reflected or fluorescent light passes through a half mirror or dichroic mirror 205 to be passed to photomultiplier tubes.

The laser scanning confocal imaging system from BioRad shown in FIG. 2 attempts simultaneous imaging of two different fluorescent stains. The 514 nm spectral line from argon ion laser 201 is used to excite both fluorescein isothiocyanate (fluorescein) and Texas Red TM (from Molecular Probes, Inc.) conjugated probes. This attempts the simultaneous excitation of different fluorescent dyes to allow selected features of the specimen to be stained in different colors and viewed together. The dual images are picked up by photomultiplier tubes 213 and 215. A second beam splitter 208 is a dichroic mirror allowing light of one wavelength to be directed to photomultiplier tube 213 while light having other wavelengths passed to photomultiplier 215.

The two images received from photomultiplier tubes 213 and 215 are used by a computer 222 to construct an image on display 224 of the specimen in a single focal plane. The simultaneous imaging of two different fluorescent stains at exactly the same focal plane would allow the identification of different specific features in the same specimen. A shortcoming of the dual color laser scanning confocal microscope system of the prior art is that the 514 nm line of the argon ion laser produces simultaneous excitation of the two fluorescent dyes (fluorescein and Texas Red TM). This simultaneous excitation causes false imaging and the loss of feature detail in the resulting image generated by the computer.

Figure 3:
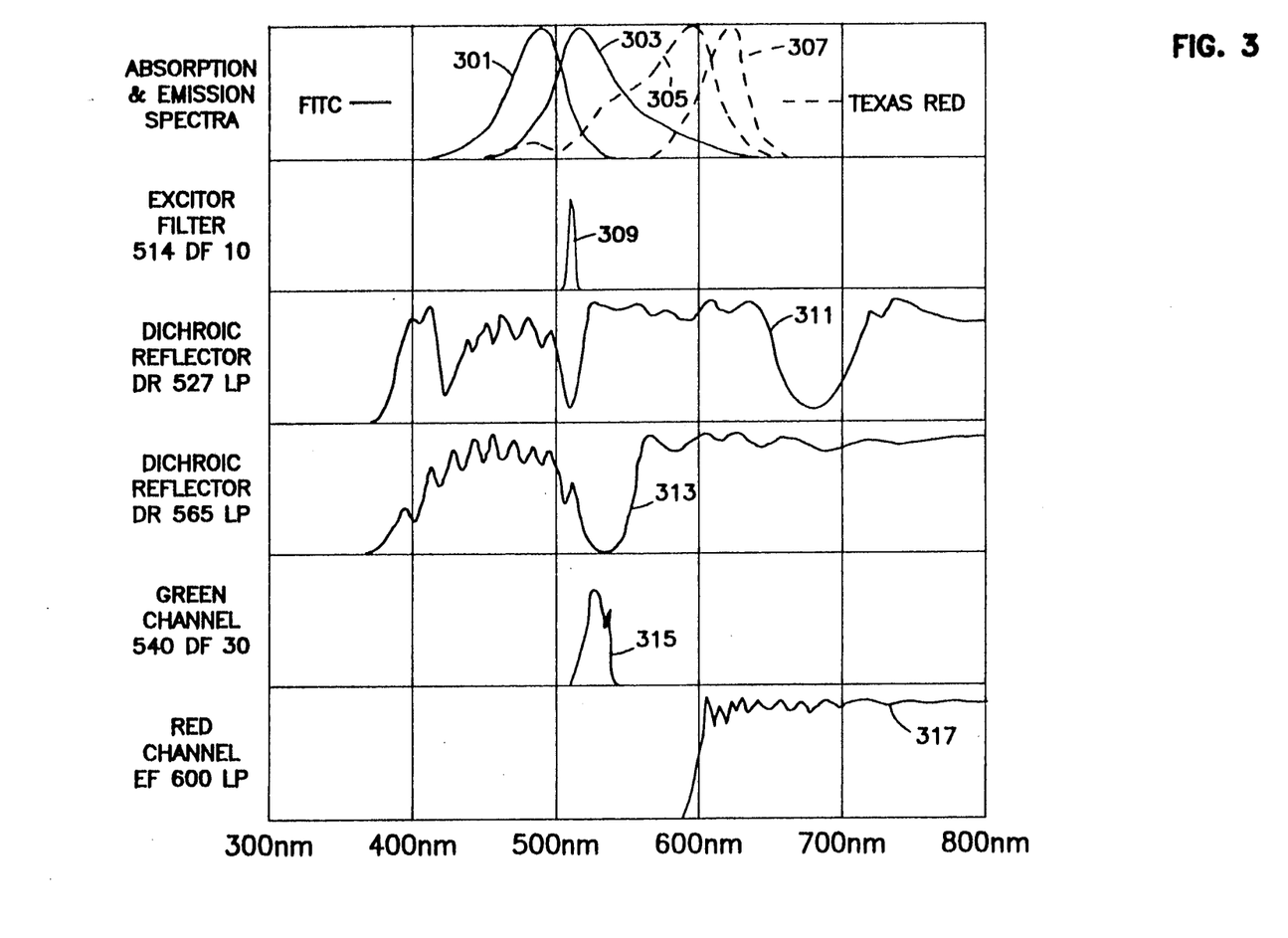
FIG. 3 shows the response spectra of the various components of FIG. 2.

FIG. 3 shows a graph published by BioRad Microscience indicating the absorption and emission spectra of fluorescein and Texas Red TM. The graph is reproduced from BioRad and only approximates the spectrums. Curve 301 describes the absorption spectra of fluorescein while curve 303 shows the emission spectra of fluorescein. Curve 305 shows the absorption spectra of Texas Red TM and curve 307 describes the emission spectra of Texas Red TM. As can be seen in FIG. 3, there is an area of overlap between the absorption spectrums of Texas Red TM and fluorescein at 514 nm. Thus, simultaneous excitation and emission of fluorescein and Texas Red TM occurs when excited with the single 514 nm line of the argon laser. Also shown in FIG. 3 is a large area of overlap between the emission spectra of Texas Red TM and the emission spectra of fluorescein.

The response curves for the filters and the dichroic reflectors are placed below the absorption and emission spectra of fluorescein and Texas Red TM in FIG. 3 for comparison. When using an argon laser to excite the dyes, the 514 nm line of the dye is the only line allowed to pass through the exciter filter 203 shown in FIG. 2. The narrow wavelength response curve 309 of FIG. 3 is for the exciter filter 203. The response curve 311 is for dichroic reflector 205 and the response curve 313 is for dichroic reflector 208. The response curve 315 is for green channel filter 211 and the response curve 317 is for red channel filter 209.

As can be seen in FIGS. 3, the intent is to have the single 514 nm line of the argon laser excite both the fluorescein and Texas Red TM dyes. The emission spectra of these respective dyes are then selected to be passed to photomultiplier tubes 213 and 215 shown in FIG. 2 to be independently detected for reconstructing a two color image at the same focal plane. The problem with this prior art technique is that the single excitation line from the argon laser excites fluorescein much more efficiently than Texas Red. For example, as shown in FIG. 3, the excitation of the fluorescein dye at a wavelength of 514 nm is at approximately 50%. The excitation of Texas Red TM at the same 514 nm wavelength, however, is very low (less than 3%). Since the emission spectra of the dyes corresponds to, and is proportional to the amount of energy absorbed by the dyes, the low amount of absorbed energy from the 514 nm line by Texas Red TM will result in a very low amount of emitted fluorescent light. Hence, the amount of fluorescein emission seen in the red channel can vary according to the relative concentrations of fluorescein and Texas Red TM. Unless the relative concentrations and saturation of the dyes accurately controlled, the emission spectra of Texas Red TM may be swamped by the "spillover" of the longer wavelengths of the fluorescein emission spectra. This confusion will result in images in which many of the features stained only with fluorescein will appear in both images. One solution to this problem is to use separate laser lines to better excite both fluorescent dyes.

Multiple line excitation of specimens dyed with different fluorochromes using two lasers is also known in the prior art. For example, a Spectra-Physics 2025 argon ion 3-watt water cooled laser (tunable to a single argon ion line between 351 nm through 528 nm) has been confocally aligned with a 5 milliwatt air-cooled argon ion laser having fixed wavelengths at 488 nm and 514 nm. The alignment of two lasers, however, presents extreme focusing problems. The two light paths must be aligned to exacting standards to ensure that the same focal plane is observed.

SUMMARY OF THE INVENTION

The shortcomings of the prior art described above and other shortcomings of the prior art which will be recognized and understood by those skilled in the art upon reading and understanding the present specification are overcome by the present invention. The present invention teaches a true multi-color laser scanning confocal imaging system for use with a microscope in which a single laser having a multi-line output is used to simultaneously or individually excite a plurality of dyes. The images may be simultaneously viewed by a plurality of photomultiplier tubes to reconstruct an image showing distinct features of a specimen stained with different dyes. The images may also be constructed using a single detector in a time-multiplex fashion and using a computer to construct the image.

DESCRIPTION OF THE DRAWINGS

In the drawings where like numerals refer to like components throughout the several views.

DETAILED DESCRIPTION OF THE PREFERRED EMBODIMENT

In the following detailed description of the preferred embodiments, references made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or physical changes may be made without departing from the spirit and the scope of the present invention. The following detailed description is, therefore, not to be taken in a limiting sense, and the scope of the present invention is defined by the appended claims.

Figure 4:
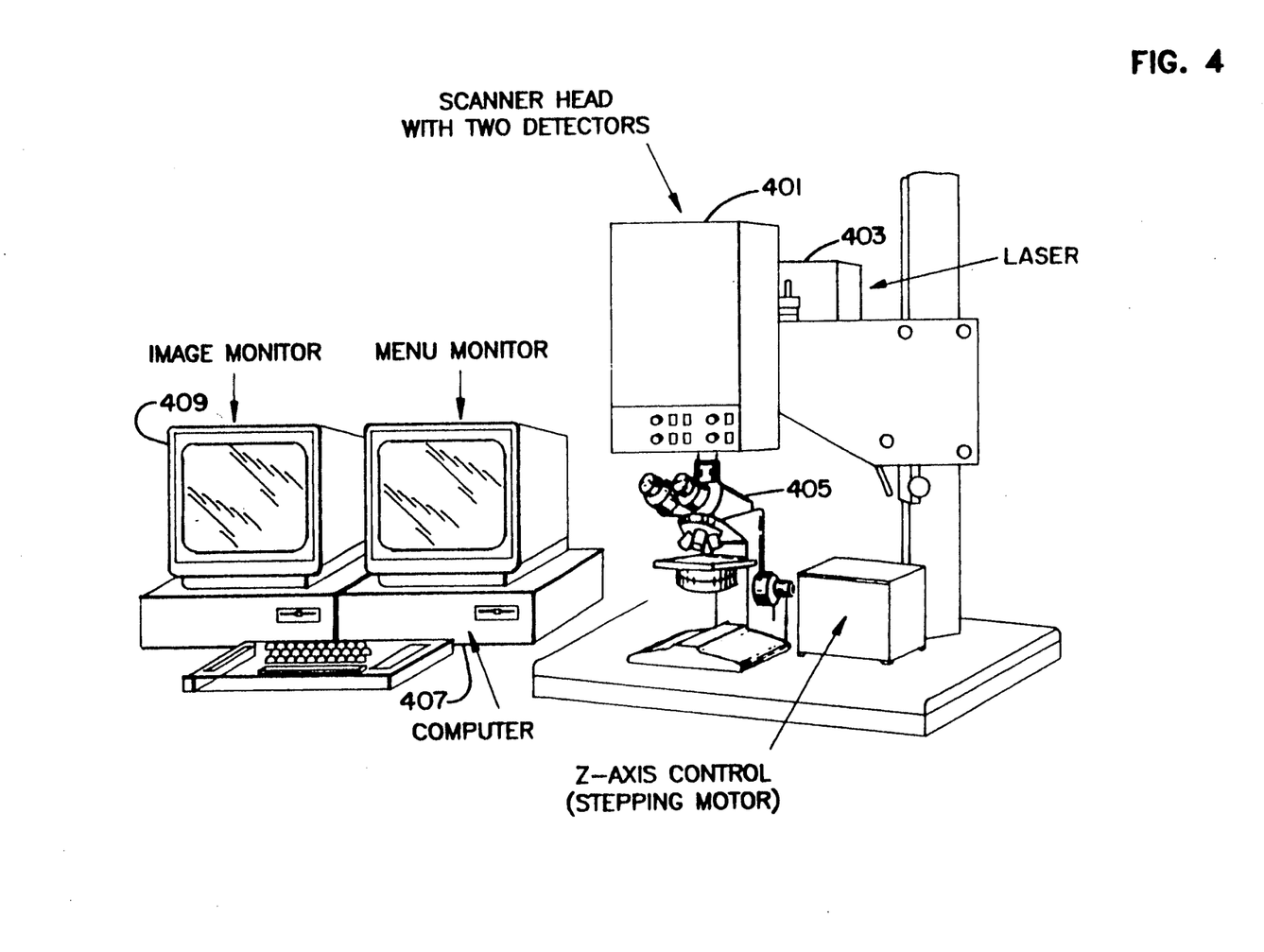
FIG. 4 shows a typical layout of the various components for the present invention.

FIG. 4 shows a typical layout of the various components for the present invention. The layout is similar to that of the MRC-600 laser scanning confocal imaging system manufactured by BioRad Microscience Ltd. of Hemel Hempstead, Herts, England. The present laser scanning confocal microscope system is also adaptable for use with a number of upright and inverted microscopes available from microscope vendors such as Nikon, Zeiss, Olympus and Leitz. The main optics and scanner head of the present invention are housed cabinet 401. The source of laser light 403 is supported near the cabinet so that the multi-line laser light enters the cabinet. In the configuration shown, the incident laser light exits the cabinet to enter the microscope 405 from the top. The reflected of emitted light is received from the microscope along the same optical path as the incident laser light.

Cabinet 401 also contains the detectors, which in the preferred embodiments are photomultiplier tubes. Those skilled in the art will readily recognize that other detectors may be used such as CCD devices, vidicon tubes, etc. The detectors within the cabinet and the scanners are connected to computer 407 which constructs the images of the specimen and displays them on display 409.

Figure 5:
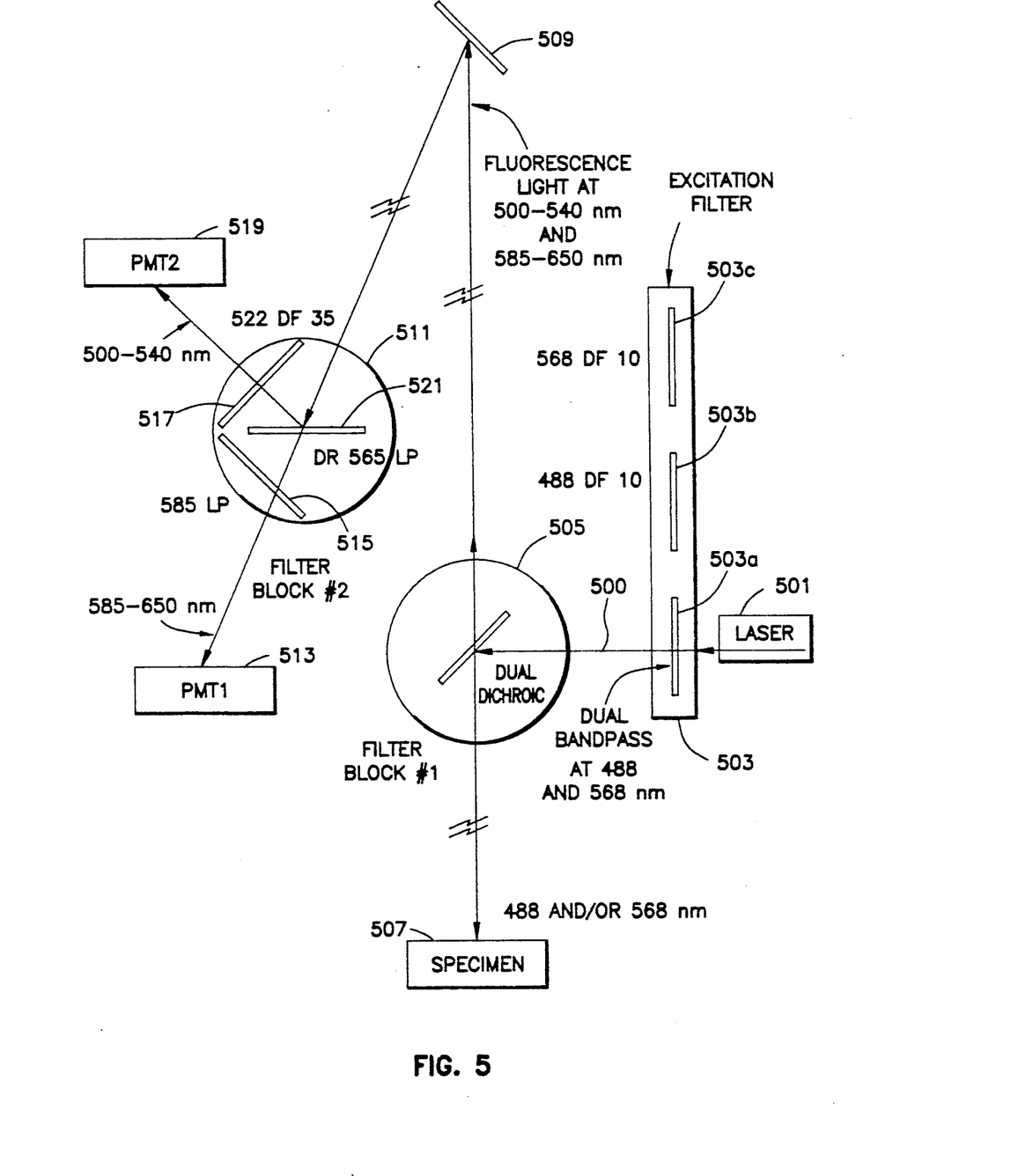
FIG. 5 is a diagram showing a two-color optical confocal microscope system using two detectors.
Figure 5A:
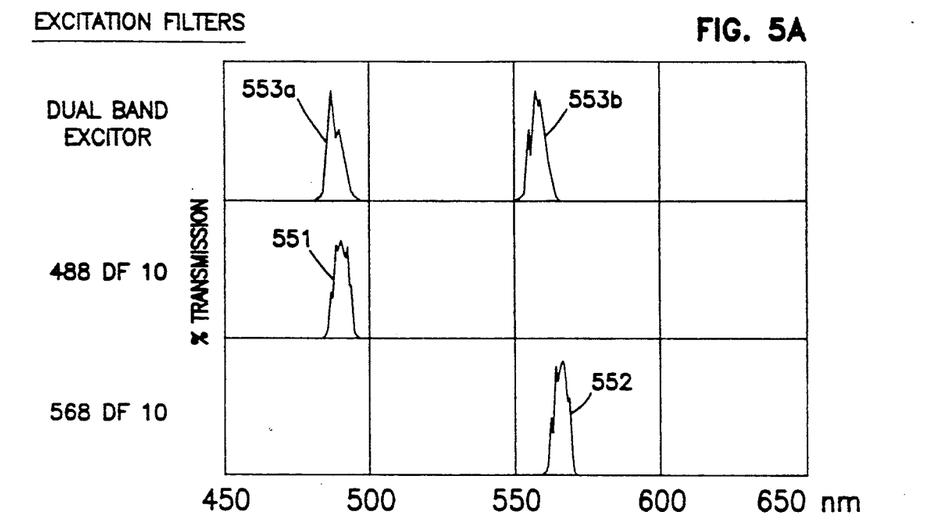
FIG. 5A shows the response spectra of the excitation filters of FIG. 5.
Figure 5B:
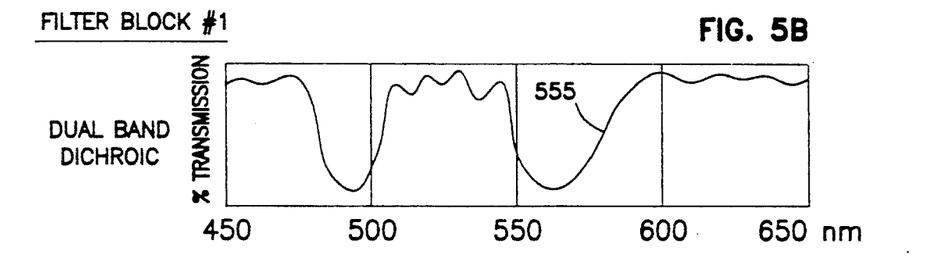
FIG. 5B shows the response spectra of filter block 1 of FIG. 5.
Figure 5C:
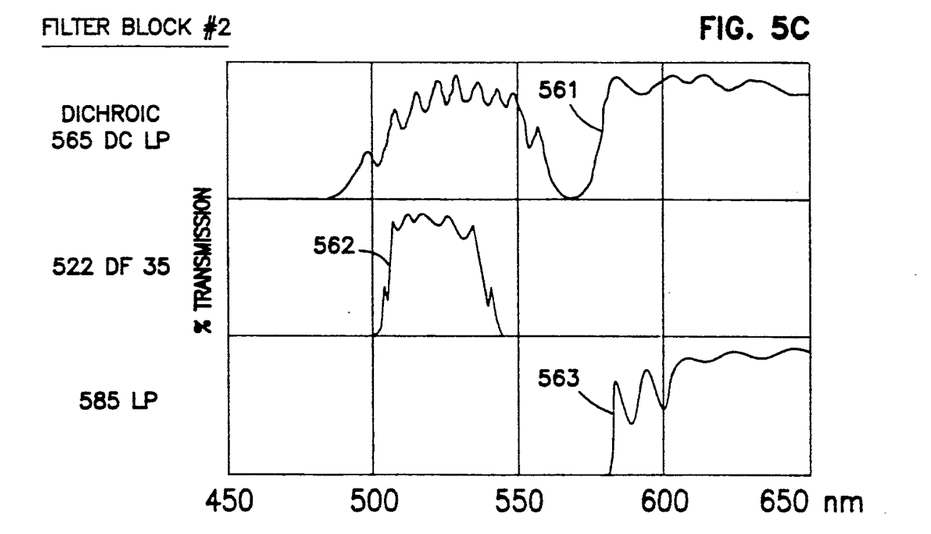
FIG. 5C shows the response spectra of the filter block 2 of FIG. 5.

FIG. 5 is a schematic diagram of a basic two-color imaging system of a preferred embodiment of the invention. The scanning unit and other mirrors (described more fully below) of the scanning confocal microscope shown in FIG. 5 have been omitted for clarity. FIG. 5A, 5B, and 5C are a series of graphs depicting the spectral response curves for the components of FIG. 5. FIGS. 5, 5A, 5B and 5C should be viewed together. The laser light source 501 is an air-cooled krypton/argon ion laser, Model No. 5470-KBR, available from Ion Laser Technology in Salt Lake City, Utah. This laser produces dominant spectral lines at 488 nm, 568 nm, and 647 nm. The design of this laser suppresses other minor lines to ensure the emission of only the 488 nm, 568 nm, and 647 nm lines. As will be described more fully below, other lasers may be used and other selected lines of laser light may be used to implement the preferred embodiments of the present invention without departing from the spirit and the scope of the claims.

The laser light 500 is filtered through excitation filter block 503. Excitation filter block 503 contains a plurality of filters selectable by the user. The filter shown selected is 503a, which is a dual bandpass filter allowing the passage of light at both 488 nm and 568 nm. Response curves 553a and 553b of FIG. 5A describe the spectral response of dual band filter 503a. The selection of two lines from laser 501 allows for the excitation of two dyes in the specimen. Response curves 551 and 552 of FIG. 5A correspond to filters 503b and 503c, respectively. Filters 503b and 503c may be used to individually select the 488 nm or 568 nm lines, respectively, from laser 501.

The filtered laser light is then passed to a dual dichroic filter block 505. The dual dichroic filter block is selected to reflect both the 488 nm and the 568 nm lines. It is also selected to transmit from 500-540 nm for the fluorescent light emitted from fluorescein, and 585-650 nm for the fluorescent light emitted from Texas Red TM. Response curve 555 of FIG. 5B depicts the spectral response of dichroic mirror 505.

The excitation of fluorescein causes the dye to emit light at a shifted wavelength with a longer wavelength than the excitation light. The incident laser light with lines at 488 nm and 568 nm is directed onto the specimen 507. The specimen has been stained with fluorescein and Texas Red TM conjugated probes to highlight features of the specimen. The emitted light from the dyes follows the same path as the excitation laser light and strikes dual dichroic filter block 505. As described above, this filter block 505 has been selected to pass light in the wavelength of 500-540 nm for fluorescein, and 585-650 nm for Texas Red TM. Response curve 555 of FIG. 5B shows the dual bandpass spectral response of dichroic mirror 505.

The emitted light strikes several reflectors shown generally as reflector 509, which directs the light to a second filter block 511. Filter block 511 includes a second dichroic mirror 521, which passes light in the 585 nm-650 nm range and reflects light in the 500 nm-540 nm range. Response curve 561 of FIG. 5C shows the spectral response of dichroic mirror 521. Photomultiplier tube 513 receives and detects emitted light passed from dichroic mirror 511 and filtered through low pass filter 515. Filter 515 is, in the preferred embodiment, a 585 LP long pass filter available from Omega. Response curve 562 of FIG. 5C shows the spectral response of filter 517. Photomultiplier tube 513 is connected to a computer (not shown in this diagram) where the information is used to construct an image in the selected focal plane on the specimen 507. The scanning head is also not shown in FIG. 5 for brevity of discussion.

Light reflected from filter block 511 in the 500-540 nanometer range is passed through filter 517, which in the preferred embodiment is a bandpass filter 522 DF 35 available from Omega. Response curve 563 of FIG. 5C shows the spectral response of filter 515. The passed light is detected by photomultiplier tube 519. The detected information is then sent to the same computer connected to photomultiplier tube 513, where a second image representative of the features stained with fluorescein in specimen 507 is created by the computer. The image detected by photomultiplier tube 513 represents features stained with the dye Texas Red ™. The images formed by the computer detected by the two photomultiplier tubes are in the exact focal plane, since the same laser light beam is used to scan the same focal plane of the specimen without moving any parts. Thus, a true multi-color simultaneous imaging system is constructed where dyes are individually excited by different lines from the same laser.

Excitation filter block 503 contains band pass filters 503b and 503c for individual selection and viewing of stained areas corresponding to fluorescein and Texas Red ™. Since the filter blocks containing the dichroic mirrors are not moved when switching excitation filters, the resulting images are perfectly aligned with respect to the focal plane. Thus, the user can select single color or a perfectly aligned multi-color image to be constructed by the computer.

Those skilled in the art will readily recognize that the excitation of dyes by the krypton/argon laser 501 is facilitated by the selection of the spectral lines of the laser light. Those skilled in the art will readily recognize that a krypton laser having dominant lines at 476/482 nm, 520 nm, 568 nm and/or 647 nm may be used to excite selected dyes and obtain results similar to those described above in conjunction with FIG. 5. Thus, a krypton laser with minor adjustments made to the filters and dichroic mirrors will produce acceptable results useable with the present invention.

Figure 6:
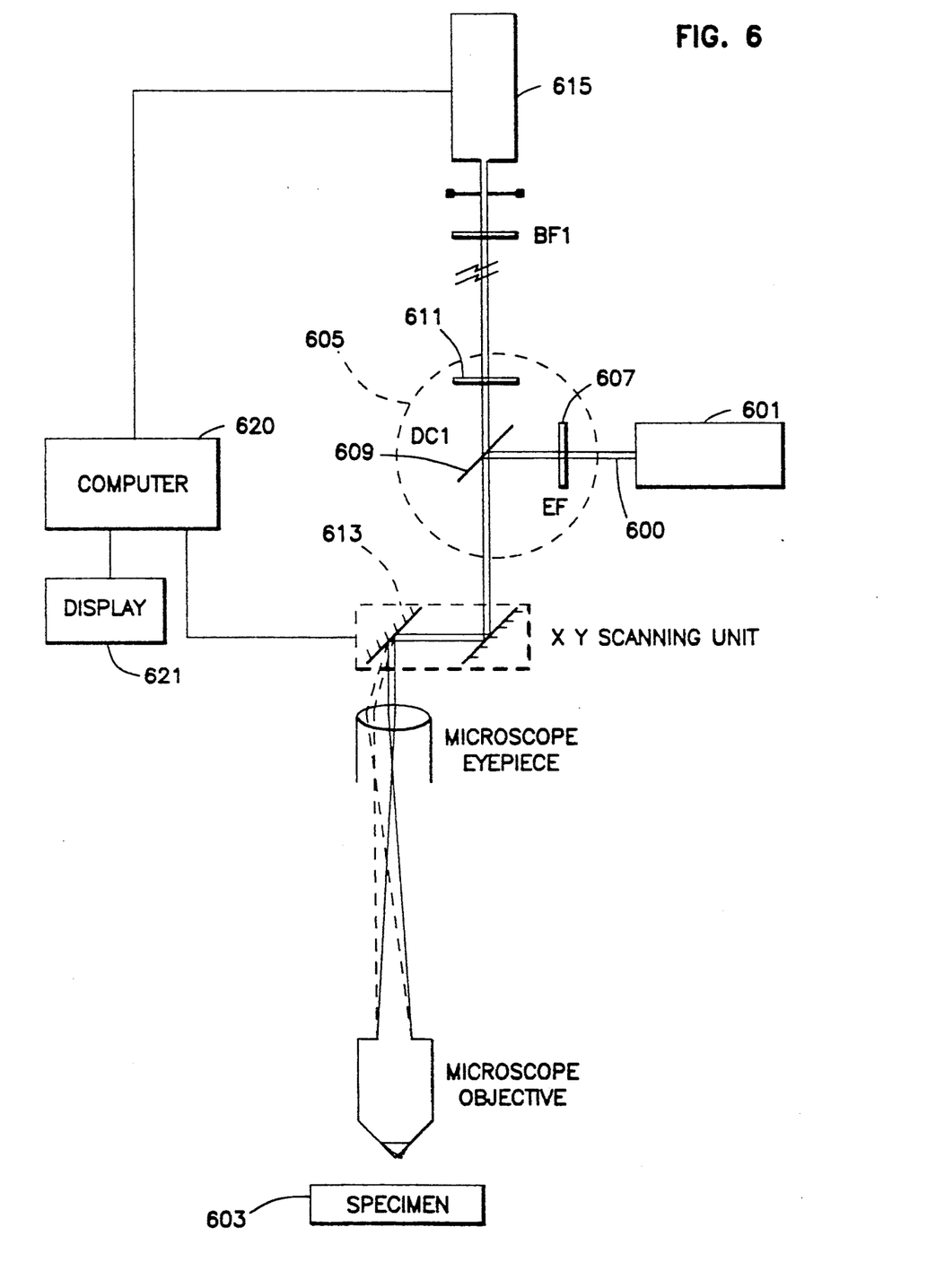
FIG. 6 is a diagram showing a time-multiplex single detector laser scanning confocal imaging system.

FIG. 6 shows a multi-color, single-detector scanning laser confocal imaging system of an alternate preferred embodiment of the present invention. The multi-color images ar serially constructed from a single detector by time-multiplex gathering of information by the computer. The laser selected for use in this embodiment is also an air-cooled krypton/argon ion laser, Model 5470-KBR available from ILT. Those skilled in the art will readily recognize that, by appropriate selection of filters and dichroic mirrors, other lasers, such as a krypton laser could be used with the present invention as described in conjunction with FIG. 6, such as an air-cooled krypton laser, Model 5470K available from Ion Laser Technology. Other vendors produce lasers which would be acceptable with the present invention.

Krypton/argon ion laser 601 produces dominant spectral lines at 488 nm, 568 nm, and 647 nm. Table 1 describes the selection of filters and mirrors to be used with the krypton/argon laser. In the construction of the preferred embodiment of the present invention described in conjunction with FIG. 6, the excitation filter 607, the dichroic mirror 609 and the emission filter 611 are all mounted together in a single filter block 605. In this fashion, matched sets of these filters may be easily substituted without disturbing the other optics by merely replacing the filter blocks 605.

TABLE 1

| Filter Block | Laser Line | Excitation Filter | Dichroic Mirror | Emission Filter |
| --- | --- | --- | --- | --- |
| Blue | 488 nm | 488 DF 10 | 500 DCLP | 522 DF 35 |
| Yellow | 568 nm | 568 DF 10 | 585 DCLP | 600 DF 20 |
| Red | 647 nm | 647 DF 10 | 660 DCLP | 665 LP |

The krypton gas of the laser produces spectral lines at 476/482 nm, 520 nm, 568 nm and 647 nm, among others. The argon gas produces spectral lines at 488 nm and 514 nm, among others. The krypton/argon laser is designed to suppress all lines except those at 488 nm, 568 nm and 647 nm. Since the 488 nm line from the argon gas excites fluorescein more efficiently, the mixed gas krypton/argon laser is preferred. Those skilled in the art will readily recognize, however, that adequate power from the 476/482 nm line of a krypton can excite fluorescein for use in the present invention. Hence, a krypton laser may be substituted for use with the present invention with the appropriate matching filters and dichroic mirrors.

The preferred krypton/argon laser from ILT is air-cooled since it is inexpensive and easily cooled. Since liquid or water-cooled lasers suffer much vibration due to the pumping of the liquid around the tube for coolant, air-cooled lasers are preferred. Air-cooled lasers, of course, are also preferred because of the cost differential between air-cooled and water-cooled high-powered lasers.

Referring once again to FIG. 6, the specimen 603 is dyed with three dyes: fluorescein, Lissamine rhodamine (or Texas Red ™), and cyanine 5.18. These dyes can be excited by the laser lines described for the krypton/argon laser and be detected by the photomultiplier tube without interference from the other dyes. In some cases, however, higher light levels for the cyanine 5.18 dye may be required due to the lower sensitivity of the photomultiplier tube to red light.

Figure 7:
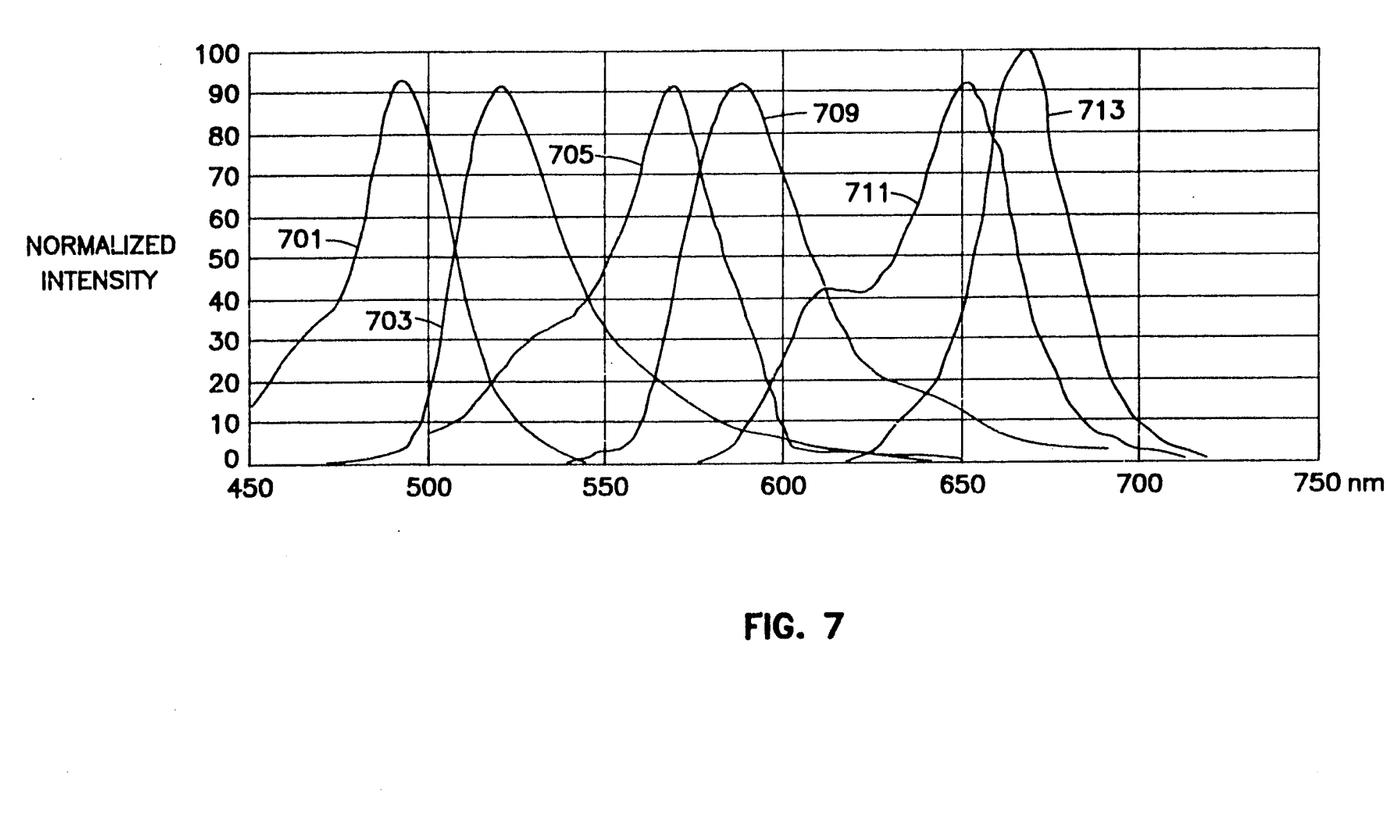
FIG. 7 shows the absorption and emission spectra of various fluorochromes.

FIG. 7 should be viewed in conjunction with an explanation of laser 601 of FIG. 6. FIG. 7 shows a graph of the absorption spectra and emission spectra of selected dyes which may be used to stain specimen 603 of FIG. 6. The graph of FIG. 7 shows the spectra curves normalized on a scale of zero to one hundred as a measure of relative intensity to one another. Curve 701 corresponds to the absorption spectra of fluorescein and curve 703 corresponds to the emission spectra of fluorescein. Curve 705 corresponds to the absorption spectra of Lissamine rhodamine and curve 709 corresponds to the emission spectra of Lissamine rhodamine. Curve 711 corresponds to the absorption spectra of cyanine 5.18 and curve 713 corresponds to the emission spectra of cyanine 5.18. With proper selection of excitation light, the emission and absorption spectra of the various selected dyes are sufficiently removed to allow filtering and detection by separate photo multiplier tubes as shown in FIG. 6.

Figure 8:
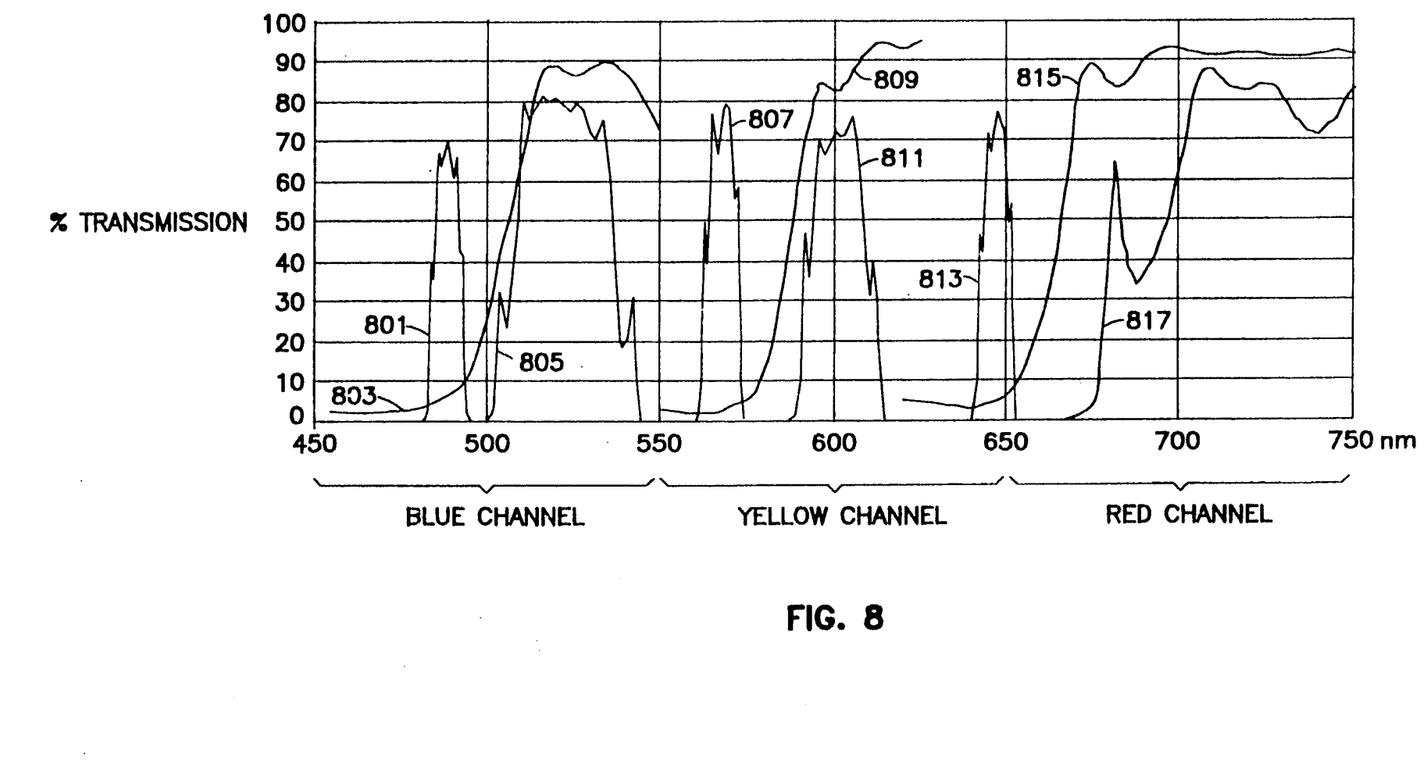
FIG. 8 shows the response spectra of the various filters and dichroic reflectors used in the time-multiplex single detector laser scanning confocal imaging system of FIG. 6.

FIG. 8 is a description of the response of the various filters of FIG. 6. The response curves are described as being part of one of three filter blocks: blue, yellow and red. Response curve 801 corresponds to the response curve of a 488 emission filter Part No. 488 DF10 available from Omega Instruments, Inc. Curve 803 is the dichroic mirror 500 DCLP long pass filter available from Omega. Response curve 805 corresponds to emission filter 522 DF 35 available from Omega. Response curves 801, 803 and 805 are part of the blue filter block.

For the yellow filter block, response curve 807 corresponds to the 10 nanometers wide emission filter Part No. 568 DF 10. Curve 809 corresponds to dichroic mirror Part No. 585 DCLP available from Omega. Curve 811 corresponds to the emission filter Part No. 600 DF 20 also available from Omega.

The red filter set corresponds to curves 813, 815 and 817. Curve 813 is the response curve for the excitation filter Part No. 647 DF 10. Curve 815 corresponds to the long pass dichroic mirror filter 660 DCLP available from Omega. Curve 817 corresponds to the emission filter which is a long pass filter 665 LP also available from Omega.

Referring once again to FIG. 6, a time-multiplexed, three-colored confocal microscope is implemented by changing the filter blocks 605 corresponding to the colors desired to be viewed in the specimen 603. The filter block 605 comprised of excitation filter 607, the dichroic mirror 609 and the emission filter 609 are all changed together to correspond to the specific dye being viewed. The multi-spectral line laser light 600 from laser 601 enters the selected excitation filter 607 which narrowly selects one of the available laser lines from the krypton/argon laser. The laser light with the selected line is reflected by preselected dichroic mirror 609 which corresponds to the selected line.

Dichroic mirror 609 will reflect the laser light containing the selected line onto the XY scanning unit 613 which causes the laser beam to be raster scanned on the specimen. XY scanning unit 613 is available within the BioRad Microscience MRC-600 confocal imaging system. The scanning unit 613 contains two mirrors which are connected to galvanometers which move the mirrors at selected scanning rates. One of the mirrors is responsible for generating an X axis scan while the other mirror produces a Y axis scan. The scanning is synchronized to the receipt of images by the photomultiplier tubes and the generation of computer images by means of a scan card and frame store in the computer 620.

The scanned laser light containing the laser line of interest is projected through the microscope objective onto specimen 603. The dye corresponding to the selected laser line fluoresces and emits a longer wavelength light in response to the excitation. The longer wavelength emitted light is passed back along the same optical path through scanning unit 613 to dichroic mirror 609. The longer wavelength emitted light passes through dichroic mirror 609 to emission filter 611. The emission filter is selected from the group described above corresponding to the selected laser line and dye to be viewed.

The emitted light through filter 611 is passed to the photomultiplier tube 615 where the scanned image is received, converted to electrical images and passed to the computer 620. The computer 620 reconstructs the image for the particular dye being excited by the selected line.

This process is duplicated for each of the colors desired to be viewed. The filter block 605 containing filters 607, 611 and dichroic mirror 609 can be easily changed without disturbing the alignment of the laser, the specimen or the photomultiplier tube. The specimen can then be scanned with the filter block for the second dye. However, by changing filter blocks, the region on the focal plane scanned may shift slightly in the XY plane due to the small differences in the angle of the dichroic mirrors in the filter blocks. After acquiring the images, the computer can combine and align the two images to produce a true two-color or pseudo color image. Quite often a pseudo color image is created wherein one color on the computer generated image corresponds to a detected color from the specimen. The color detected from the specimen may not correspond to the color used by the computer to highlight the features stained by that particular dye since it may be more aesthetically pleasing to view higher contrasting colors than the actual colors received from the specimen.

In addition, the filter block 605 may be replaced by the third filter set and a third color scanned and combined with the previous two images to generate a true three-colored image by computer 620.

Figure 9:
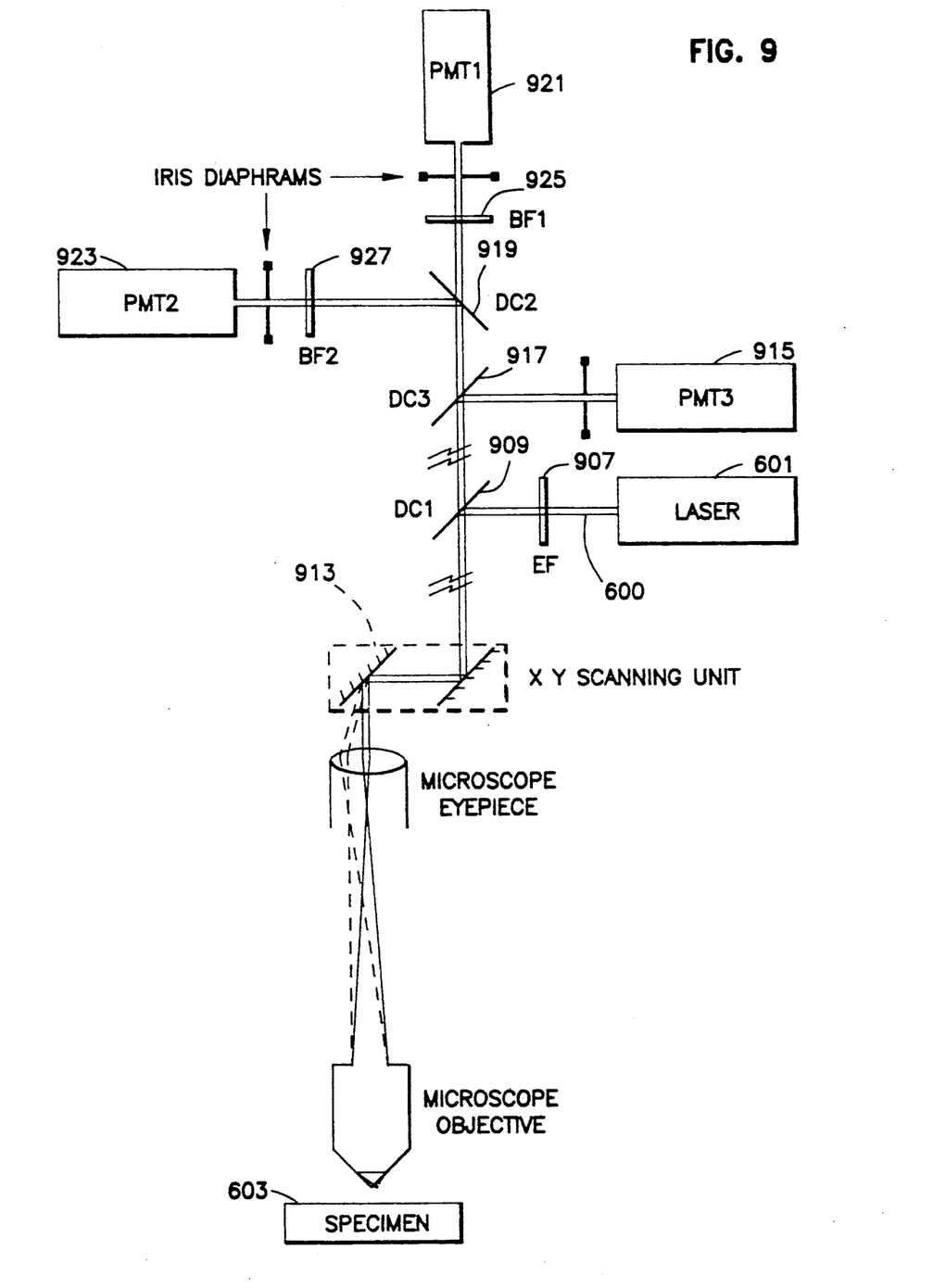
FIG. 9 is a diagram showing a multi-detector, multi-color optical confocal microscope system using three detectors.

FIG. 9 shows a true three-color laser scanning confocal microscope which does not require the substitution of filter blocks to generate a three-color image. With the embodiment shown in FIG. 9, a simultaneous three-color image may be scanned in which all three laser lines excite the dyes simultaneously. Laser 601 is a krypton/argon laser as described above. The multi-line laser light 600 passes through a broad-bandpass filter 907 where it is reflected by multi-passband dichroic mirror 909. The laser excitation light 600 is raster scanned by scanning unit 913 and enters the microscope eyepiece.

The specimen 603 is stained with dyes as described above which fluoresce when excited. The emitted light follows the same optical path followed by the excitation laser light through the scanning unit 913. The emitted light has a longer wavelength than the excitation light and passes through multi-passband dichroic mirror 909. The emitted light then strikes a second dichroic mirror 917 selected to reflect blue light and pass the other colors. Photomultiplier tube 915 receives blue light emitted by fluorescein as filtered by emission filter 607.

The longer wavelength emitted light has passes through the second dichroic mirror 917 where it strikes a third dichroic mirror 919 selected to reflect red light and pass longer wavelength red light. Photomultiplier tube 921 receives red light emitted by Lissamine rhodamine or Texas Red TM ) as filtered by emission filter 925. Photomultiplier tube 923 receives longer wavelength red light emitted by cyanine 5.18.

Fluorescein conjugated probes are one of several dyes available for use in conjunction with the preferred embodiments of the present invention in staining specimens and examining selected features. Table 2 describes a number of dyes that may be used with the present invention.

TABLE 2

Fluorescent Dyes for Conjugation

Fluorescein isothiocyanate (FITC)
Borate-dipyrromethane ("Bodipy)
Lucifer Yellow
Tetramethylrhodamine isothiocycanate (TRITC)
Lissamine rhodamine
Texas Red TM (from Molecular Probes, Inc.)
Allophycocyanine
Ultralite T-680 TM (Ultra Diagnostics Corp, Seattle WA)
Ultralite T-700 TM (Ultra Diagnostics Corp, Seattle WA)
Carboxycyanine derivatives
(for example, cyanine 5.18 from Molecular Probes
or Jackson Immunoresearch Labs, Inc. of
West Grove, PA)

Nuclear Stains

Chromomycin A3 (Sigma Chemical Co.) (DNA specific and spectrally similar to fluorescein)
Ethidium bromide
Propidium iodide
LD700 (from Esciton Chemical Co., Dayton OH)
Acridine Orange
Pararosaniline (end product of Feulgen reaction)

Physiological Indicators

Fluo-3 TM (calcium indicators) (Molecular Probes Inc.)
Rhod-2 TM (calcium indicators)
SNAFL TM (ph indicators)
SNARF TM (ph indicators)

While the present invention has ben described in connection with the preferred embodiment thereof, it will be understood that many modifications will be readily apparent to those of ordinary skill in the art, and this application is intended to cover any adaptations or variations thereof. The present invention is intended to be used in many fields of art analogous to, and in addition to the fields described above, including flow cytometry. Therefore, it is manifestly intended that this invention be limited only by the claims and equivalents thereof.

What is claimed:

1. A multi-color confocal microscopy system for use with an optical microscope in viewing a specimen stained with a plurality of stains, which stains fluoresce when excited by light of particular frequencies, comprising:

laser means for producing multi-line incident laser light having multiple excitation lines from a single laser light source, each of said excitation lines corresponding to an excitation frequency of one of the stains;

means for directing said incident laser light into the microscope and for receiving emitted light from the microscope, said emitted light having multiple fluorescent emissions, each of said fluorescent emissions corresponding to an excitation frequency of one of the stains;

detector means positioned to receive said emitted light for converting said emitted light into electrical signals; and control means connected to said detector means for accumulating said electrical signals and for producing a plurality of images of the specimen at a precise focal plane, each of said images corresponding to one of said lines of said laser.

2. The multi-color confocal microscopy system according to claim 1 further including means connected to said laser means for suppressing the production of excitation lines which would excite more than one stain.

3. The multi-color confocal microscopy system according to claim 1 further including filter means positioned in the path of said incident laser light for selectively passing a selected one of said excitation lines from said laser means.

4. The multi-color confocal microscopy system according to claim 1 further including filter means positioned in the path of said emitted light for selectively passing a selected emission of said fluorescent to said detector means.

5. The multi-color confocal microscopy system according to claim 4 wherein said filter means includes a dichroic mirror positioned in the path of said emitted light for separating each of said fluorescent emissions into separate line-paths and for directing each of said line-paths into one of a plurality of detectors.

6. The multi-color confocal microscopy system according to claim 3 wherein said detector means includes means for detecting one at a time and forming a multi-color optical image on a time-multiplexed basis.

7. The multi-color confocal microscopy system according to claim 1 wherein said means for directing further includes means for scanning said incident laser light onto the specimen in a raster-scan format and wherein said detector means further includes means for descanning said emitted light.

8. The multi-color confocal microscopy system according to claim 1 wherein said control means further includes a computer having a display means for displaying the specimen in a plurality of pseudo-colors, each of said pseudo-colors corresponding to the fluorescent emission of the emitted light of one of the stains.

9. The multi-color confocal microscopy system according to claim 1 wherein said laser means further includes a single krypton-argon laser.

10. The multi-color confocal microscopy system according to claim 9 wherein said krypton-argon laser is configured to produce a plurality of laser lines such that each line recites at most only one of Fluorescein, Lissamine Rhodamine, and cyanine 5.18 stains.

11. The multi-color confocal microscopy system according to claim 1 wherein said detector means further includes photomultiplier tubes.

12. The multi-color confocal microscopy system for use with an optical microscope viewing a specimen stained with a plurality of stains, comprising:

a multi-line laser producing laser light having a plurality of lines, some of said lines being selectively prevented from exiting said laser, and some other of said lines being selectively allowed to exit said laser as excitation lines, each of said excitation lines selected to correspond to an excitation frequency of only one of the plurality of stains;

a plurality of excitation filters each selectively placed in the path of said laser light;

a first dichroic mirror placed in the path of said laser light behind said excitation filters, said first dichroic mirror selected to reflect excitation lines and to pass emitted fluorescent light;

a scanning unit placed to receive said laser light from said first dichroic filter and reflect said laser light in a raster-scanned form into the optical microscope;

said scanning unit further placed to receive said emitted fluorescent light from the optical microscope, to descan said raster-scanned form and to reflect said emitted fluorescent light back through said first dichroic filter;

a second dichroic mirror placed in the path of said fluorescent light behind said first dichroic filter, said second dichroic mirror selected to reflect some wavelengths of said fluorescent emission of said emitted light and pass other wavelengths of said emitted fluorescent light; and a first detector placed to receive said reflected fluorescent light passed from said second dichroic mirror and a second detector placed to receive said reflected fluorescent light reflected from said second dichroic mirror.

13. A method of viewing a specimen stained with a plurality of stains, which stains fluoresce when excited by light of particular frequencies, comprising the steps of:

producing multi-line incident laser light having multiple excitation lines from a single laser light source, each of said excitation lines corresponding to an excitation frequency of one of the stains;

directing said incident laser light into a microscope holding the specimen;

receiving emitted light from the microscope, said emitted light having multiple fluorescent emissions, each of said fluorescent emissions corresponding to an excitation frequency of one of the stains;

detecting said emitted light and converting said emitted light into electrical signals; and accumulating said electrical signals and producing a plurality of images of the specimen at a precise focal plane, each of said images corresponding to one of said lines of said laser.

14. The method according to claim 13 further including the step of suppressing the production of excitation lines which would excite more than one stain.

15. The method according to claim 13 further including the steps of filtering said incident laser light and selectively passing a selected one of said excitation lines.

16. The method according to claim 13 further including the steps of filtering said emitted light and for selectively passing a selected emission of said fluorescent.

* * * * *

UNITED STATES PATENT AND TRADEMARK OFFICE
CERTIFICATE OF CORRECTION

Page 1 of 2

PATENT NO. : 5,127,730
DATED : July 7, 1992
INVENTOR(S) : Todd C. Brelje, et. al.

It is certified that error appears in the above-indentified patent and that said Letters Patent is hereby corrected as shown below:

Title page, item [57], Abstract, col. 2, line 7, delete "strained" and insert --stained-- therefor.

Column 3, line 61, delete "Figs. 3" and insert --Fig. 3-- therefor.

Column 4, line 2, delete "Texas Red" and insert --Texas Red$^{TM}$-- therefor.

Column 7, line 33, delete "ar" and insert --are-- therefor.

Column 8, line 44, delete "photo multiplier" and insert --photomultiplier-- therefor.

Column 9, line 6, delete "609" and insert --611--therefor. (2nd occurrence).

Column 10, line 24, delete "passes" and insert --passed--therefor.

Column 10, line 43, Table 2, delete "isothiocycanate" and insert --isothiocyanate--therefor.

UNITED STATES PATENT AND TRADEMARK OFFICE
CERTIFICATE OF CORRECTION

PATENT NO. : 5,127,730
DATED : July 7, 1992
INVENTOR(S) : Todd C. Brelje et al.

It is certified that error appears in the above-identified patent and that said Letters Patent is hereby corrected as shown below:

In Column 10, line 56, delete "Esciton" and insert --Exciton-- therefor.

In Column 10, lin3 64, delete "ben" and insert --been-- therefor.

In Column 12, line 2, delete "recites" and insert --excites-- therefor.

In Column 12, line 3, delete "Rhodamine" and insert --rhodamine-- therefor.

In Column 12, claim 12, line 7, delete "The" and insert --A-- therefor.

Signed and Sealed this

Twenty-first Day of December, 1993

Attest:

BRUCE LEHMAN

*Attesting Officer*  *Commissioner of Patents and Trademarks*